(12) United States Patent
Kojima et al.

(10) Patent No.: US 9,767,546 B2
(45) Date of Patent: Sep. 19, 2017

(54) IMAGE INSPECTION APPARATUS, IMAGE INSPECTION SYSTEM AND IMAGE INSPECTION METHOD

(71) Applicants: Keiji Kojima, Kanagawa (JP); Hiroyoshi Ishizaki, Kanagawa (JP); Tadashi Kitai, Kanagawa (JP); Hitomi Kaneko, Saitama (JP)

(72) Inventors: Keiji Kojima, Kanagawa (JP); Hiroyoshi Ishizaki, Kanagawa (JP); Tadashi Kitai, Kanagawa (JP); Hitomi Kaneko, Saitama (JP)

(73) Assignee: RICOH COMPANY, LIMITED, Tokyo (JP)

( * ) Notice: Subject to any disclaimer, the term of this patent is extended or adjusted under 35 U.S.C. 154(b) by 531 days.

(21) Appl. No.: 14/358,178

(22) PCT Filed: Sep. 12, 2013

(86) PCT No.: PCT/JP2013/075378
§ 371 (c)(1),
(2) Date: May 14, 2014

(87) PCT Pub. No.: WO2014/042280
PCT Pub. Date: Mar. 20, 2014

(65) Prior Publication Data
US 2014/0314281 A1    Oct. 23, 2014

(30) Foreign Application Priority Data

Sep. 14, 2012  (JP) .................................. 2012-203587
Aug. 9, 2013   (JP) .................................. 2013-166556

(51) Int. Cl.
*G06T 7/00*     (2017.01)
*B41F 33/00*    (2006.01)
*H04N 1/00*     (2006.01)

(52) U.S. Cl.
CPC ........ *G06T 7/0008* (2013.01); *B41F 33/0036* (2013.01); *G06T 7/001* (2013.01);
(Continued)

(58) Field of Classification Search
CPC .................. H04N 1/6055; G06T 7/001; G06T 2207/30144; G06K 9/6201–9/6215; B41F 33/0036
See application file for complete search history.

(56) References Cited

U.S. PATENT DOCUMENTS 5,680,472 A *  10/1997  Conant .................. G07D 7/121
                                                 382/135
7,884,847 B2   2/2011   Kojima et al.
(Continued)

FOREIGN PATENT DOCUMENTS

CN    101013432 A    8/2007
CN    101207681 A    6/2008
(Continued)

OTHER PUBLICATIONS

Chinese Office Action and English translation thereof dated Jun. 18, 2015.
(Continued)

*Primary Examiner* — Stephen R Koziol
*Assistant Examiner* — Raphael Schwartz
(74) *Attorney, Agent, or Firm* — Harness, Dickey & Pierce, P.L.C.

(57) ABSTRACT

An image inspection apparatus for checking an image printed on a recording medium includes: a reference pixel obtaining unit configured to generate a reference image and obtain a first pixel value from the reference image; a print pixel obtaining unit configured to extract an image printed area and obtain a second pixel value from the image; an offset processing unit configured to add a non-image-printed (Continued)

area; and an image checking unit configured to compute a difference between the first image pixel value and the second image pixel value and detect an error when the difference is higher than a predetermined threshold value, wherein the non-image-printed area contains a third pixel value that is different from the first pixel value or the second pixel value, and the image checking unit suspends a determination whether or not there is an error in the image printed area associated with the non-image-printed area.

15 Claims, 14 Drawing Sheets

(52) U.S. Cl.
CPC ....... *H04N 1/00005* (2013.01); *H04N 1/0005* (2013.01); *H04N 1/00034* (2013.01); *H04N 1/00045* (2013.01); *H04N 1/00068* (2013.01); *H04N 1/00076* (2013.01); *G06T 2207/10008* (2013.01); *G06T 2207/30144* (2013.01); *G06T 2207/30168* (2013.01); *G06T 2207/30176* (2013.01)

(56) References Cited

U.S. PATENT DOCUMENTS

| | | | |
|---|---|---|---|
| 7,903,288 | B2 | 3/2011 | Takeishi |
| 2004/0057629 | A1* | 3/2004 | Shikami ............. G01N 21/8851 382/254 |
| 2011/0006475 | A1* | 1/2011 | Nireki ..................... G07D 7/12 271/264 |
| 2012/0121139 | A1 | 5/2012 | Kojima et al. |
| 2012/0147397 | A1 | 6/2012 | Kawamoto |
| 2013/0044342 | A1 | 2/2013 | Kaneko et al. |
| 2013/0044347 | A1 | 2/2013 | Kitai et al. |
| 2013/0250319 | A1 | 9/2013 | Kaneko et al. |
| 2013/0250369 | A1 | 9/2013 | Kitai et al. |
| 2013/0250370 | A1 | 9/2013 | Kojima et al. |

FOREIGN PATENT DOCUMENTS

| | | |
|---|---|---|
| CN | 100456305 C | 1/2009 |
| JP | 5-068145 | 3/1993 |
| JP | 7-101048 | 4/1995 |
| JP | 9-131951 | 5/1997 |
| JP | 2001-066715 | 3/2001 |
| JP | 2002-158854 | 5/2002 |
| JP | 2004-195878 | 7/2004 |
| JP | 2004-310726 | 11/2004 |
| JP | 2005-297385 | 10/2005 |
| JP | 2007-331874 | 12/2007 |
| JP | 2009-234724 | 10/2009 |
| JP | 2012-137481 | 7/2012 |
| JP | 4974968 B2 | 7/2012 |
| KR | 20070079331 A | 8/2007 |
| TW | 200805200 A | 1/2008 |

OTHER PUBLICATIONS

Abstract for JP2009-288942, which corresponds to JP 4974968.
International Search Report and Written Opinion issued Nov. 19, 2013 in PCT/JP2013/075378 filed on Sep. 12, 2013.

* cited by examiner

READ IMAGE          MASTER IMAGE

IMAGE INSPECTION APPARATUS, IMAGE INSPECTION SYSTEM AND IMAGE INSPECTION METHOD

TECHNICAL FIELD

This invention is concerning an image inspection apparatus, an image inspection system, and an image inspection method. More particularly, the invention is concerning the determination of and processing on a targeted area for inspection in a read image.

BACKGROUND ART

Conventional inspection of printouts has been performed manually. Recently, however, apparatuses for inspecting printouts have been used as post-processing of offset printing. In such inspection apparatuses, a printout is read for several times and an excellent read image is selected manually out of them, thereby generating a master image serving as a standard for inspection. A certain area of the generated master image is compared with a corresponding area of read image of the targeted printout for inspection. Depending on the level of the difference between the master image and the read image, defects on printouts are determined.

Digital printers such as electrophotographic printers that have become popular these days are good for printing a small number of copies or for variable printing in which printed contents often vary for each copy. For that reason, generating master images from printouts to be used for comparison inspection, in the same manner as the conventional offset printer, is inefficient. To address this issue, it can be considered to generate master images from print data. This can enable digital printers to correspond to variable printing efficiently.

In such image inspection processing, determination whether the printout is defective is performed as follows: align the positions of a read image generated by reading a printout sheet and a master image generated from print data, match the size of the read image and that of the master image, compare them with each other for each pixel therein to obtain the difference between the read image and the master image, and compare the difference and a predetermined threshold.

In such printout defect detection technologies, for inspecting the whole of the printout sheet, the printout sheet may be read in a larger area than the size of the printout sheet, thereby preventing the edges of the sheet from being excluded from the reading range of the sheet. In this case, the area outside of the sheet is displayed, i.e., the color of the surface of a conveying body such as a carriage belt that conveys the sheet is displayed on the end areas of the read image. The master image used for comparing with the read image therefore needs to be generated by adding the color of the surface of the carriage belt, for example, around the print data.

Another technology of inspection by comparing images is developed in which no-inspection areas are set for disabling determination as defective thereon when the difference from a standard image is found in a predetermined area (refer to PTL 1, for example).

By applying the above-described technology as disclosed in PTL 1 to the area outside of a document, the area outside of the document can be determined as a no-inspection area. This requires manual setting of such a no-inspection area, which may burden the users with manual operations.

In view of the foregoing, embodiments of the present invention aim to provide an image inspection in which a master image is compared with a read image generated by reading a printed output result of the image formation and output, which can readily determine an area outside of a document.

DISCLOSURE OF INVENTION

According to an aspect of the invention, an image inspection apparatus for checking an image printed on a recording medium is provided. The image inspection apparatus includes: a reference pixel obtaining unit configured to generate a reference image from image data configuring the image and obtain a first pixel value from the reference image; a print pixel obtaining unit configured to extract an image printed area containing the recording medium on which the image to be checked is printed, and obtain a second pixel value from the image to be checked; an offset processing unit configured to add a non-image-printed area so as to surround the reference image on the periphery of the reference image; and an image checking unit configured to compute a difference between the first image pixel value and the second image pixel value and detect an error when the difference is higher than a predetermined threshold value, wherein the non-image-printed area contains a third pixel value that is significantly different from either the first pixel value or the second pixel value, and the image checking unit suspends a determination whether or not there is an error in the image printed area associated with the non-image-printed area.

According to another aspect of the invention, an image inspection system including: an image data forming unit configured to form image data of an image to be printed; an image data controller configured to receive the image data and control the image data; a print processing unit connected to the image data controller and configured to print the image according to the image data on a recording medium; and an image checking unit for checking an image printed on the recording medium and connected to the image data controller and the print processing unit is provided. The image checking unit includes: a reference pixel obtaining unit configured to generate a reference image from the image data configuring the image and obtain a first pixel value from the reference image; a print pixel obtaining unit configured to extract an image printed area containing the recording medium on which the image to be checked is printed, and obtain a second pixel value from the image to be checked; an offset processing unit configured to add a non-image-printed area so as to surround the reference image on the periphery of the reference image; and an image checking unit configured to compute a difference between the first image pixel value and the second image pixel value and detect an error when the difference is higher than a predetermined threshold value, wherein the non-image-printed area contains a third pixel value that is significantly different from either the first pixel value or the second pixel value, and the image checking unit suspends a determination whether or not there is an error in the image printed area associated with the non-image-printed area.

According to further aspect of the invention, an image inspection method for checking an image printed on a recording medium is provided. The method includes: generating a reference image from image data configuring the image and obtaining a first pixel value from the reference image; extracting an image printed area containing the recording medium on which an image to be checked is printed, and obtaining a second pixel value from the image to be checked; adding a non-image-printed area so as to surround the reference image on the periphery of the reference image; and computing a difference between the first image pixel value and the second image pixel value and detecting an error when the difference is higher than a predetermined threshold value, wherein the non-image-printed area contains a third pixel value that is significantly different from either the first pixel value or the second pixel value, and the image checking unit suspends a determination whether or not there is an error in the image printed area associated with the non-image-printed area.

ADVANTAGEOUS EFFECTS OF INVENTION

According to an embodiment of the present invention, an image inspection in which a master image is compared with a read image generated by a reading printed output result of the image formation and output can readily determine an area outside of a document.

BEST MODE(S) FOR CARRYING OUT THE INVENTION

Exemplary embodiments according to the present invention are described in detail below with reference to the accompanying drawings. In the embodiments, an image forming system includes an inspection apparatus that inspects output results by comparing a read image of an output result of image formation and output with a master image. The image forming system performs processing of determination on a targeted range for inspection in the read image based on the master image.

Figure 1:
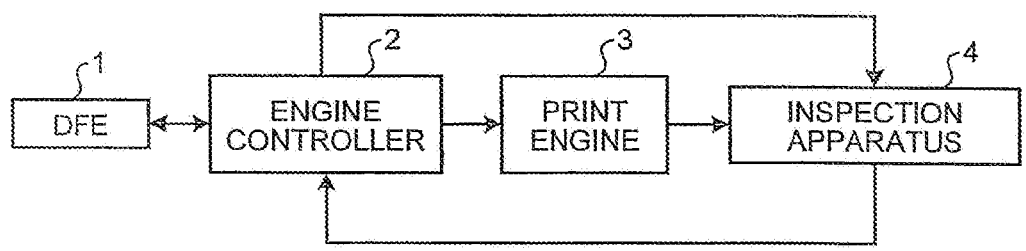
FIG. 1 is a chart illustrating the structure of an image forming system including an inspection apparatus according to an embodiment of the present invention.

FIG. 1 is a chart illustrating the entire structure of an image forming system according to an embodiment of the present invention. As illustrated in FIG. 1, the image forming system according to the embodiment includes a digital front end (DFE) 1, an engine controller 2, a print engine 3, and an inspection apparatus 4. The DFE 1 generates image data to be printed out, that is, bitmap data serving as a targeted image for output based on a received print job, and outputs the generated bitmap data to the engine controller 2.

The engine controller 2 controls the print engine 3 to form images and output the images based on the bitmap data received from the DFE 1. The controller 2 according to the embodiment of the present invention transmits bitmap data received from the DFE 1 to the inspection apparatus 4. The bitmap data is used as original information of an image for inspection referred to by the inspection apparatus 4 to inspect an output result of image formation and output from the print engine 3.

The print engine 3 performs image formation and output on a paper sheet serving as a recording medium based on the bitmap data under control of the engine controller 2, reads the output sheet using a reading device 302, and inputs the read image data generated by the reading device to the inspection apparatus 4. Examples of recording media may include a film and a plastic sheet in addition to the above-described paper sheet as long as they can be a target for image formation and output. The inspection apparatus 4 then generates a master image based on the bitmap data input from the engine controller 2. The inspection apparatus 4 is an image inspection apparatus that inspects output results by subsequently comparing the read image input from the print engine 3 with the above-described generated master image.

Figure 2:
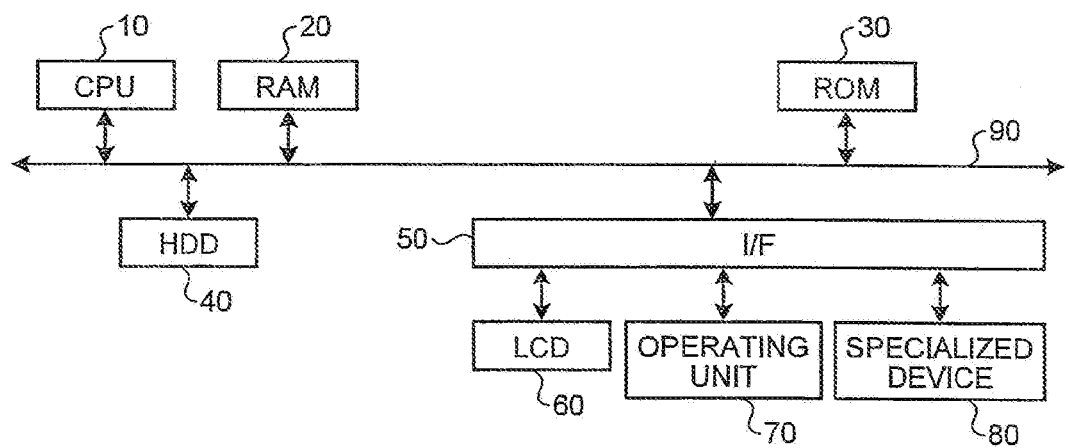
FIG. 2 is a block diagram illustrating the hardware structure of the inspection apparatus according to the embodiment of the present invention.

The following describes the hardware structure including the functional blocks of the engine controller 2, the print engine 3, and the inspection apparatus 4 according to the embodiment of the present invention, with reference to FIG. 2. FIG. 2 is a block diagram illustrating the hardware structure of the inspection apparatus 4 according to the embodiment. Although FIG. 2 illustrates the hardware structure of the inspection apparatus 4 only, the engine controller 2 and the print engine 3 have the same hardware structure.

As illustrated in FIG. 2, the inspection apparatus 4 according to the embodiment has the same structure as typical personal computers (PCs), servers, and other information processing devices. Specifically, the inspection apparatus 4 according to the embodiment includes a central processing unit (CPU) 10, a random access memory (RAM) 20, a read only memory (ROM) 30, a hard disk drive (HDD) 40, and an interface (I/F) 50 coupled to each other through the bus 90. In addition, a liquid crystal display (LCD) 60, an operating unit 70, and a specialized device 80 are coupled to the I/F 50.

The CPU 10 is a calculating unit and controls operations of the inspection apparatus 4 totally. The RAM 20 is a high-speed readable and writable volatile storage medium and is used as a working area for the CPU 10 to process information. the ROM 30 is a read-only non-volatile storage medium and stores therein computer programs such as firmware. The HDD 40 is a readable and writable non-volatile storage medium and stores therein an operating system (OS), various types of control programs, and application programs, for example.

The I/F 50 couples the bus 90 to various types of hardware and networks and controls them. The LCD 60 is a visual user interface for users to check the state of the inspection apparatus 4. The operating unit 70 is a user interface such as a keyboard and a mouse for users to input various kinds of information to the inspection apparatus 4.

The specialized device 80 is hardware for implementing specialized functions in the engine controller 2, the print engine 3, and the inspection apparatus 4. For example, the specialized device 80 makes the print engine 3 function as a plotter that performs image formation and output on sheets, or a reading device that reads printed images output on sheets. The specialized device 80 makes the engine controller 2 and the inspection apparatus 4 function as specialized calculating devices that perform high-speed image processing. Such specialized calculating devices are achieved as an application specific integrated circuit (ASIC), for example.

In such hardware structure, computer programs stored in the ROM 30, the HDD 40, or not-illustrated recording media such as an optical disk are loaded into the RAM 20 and the CPU 10 performs calculation based on the loaded computer programs. As a result, a software control unit is implemented. The combination of such implemented software control unit and the hardware achieves the functional blocks for implementing the functions of the engine controller 2, the print engine 3, and the inspection apparatus 4 according to the embodiment.

Figure 3:
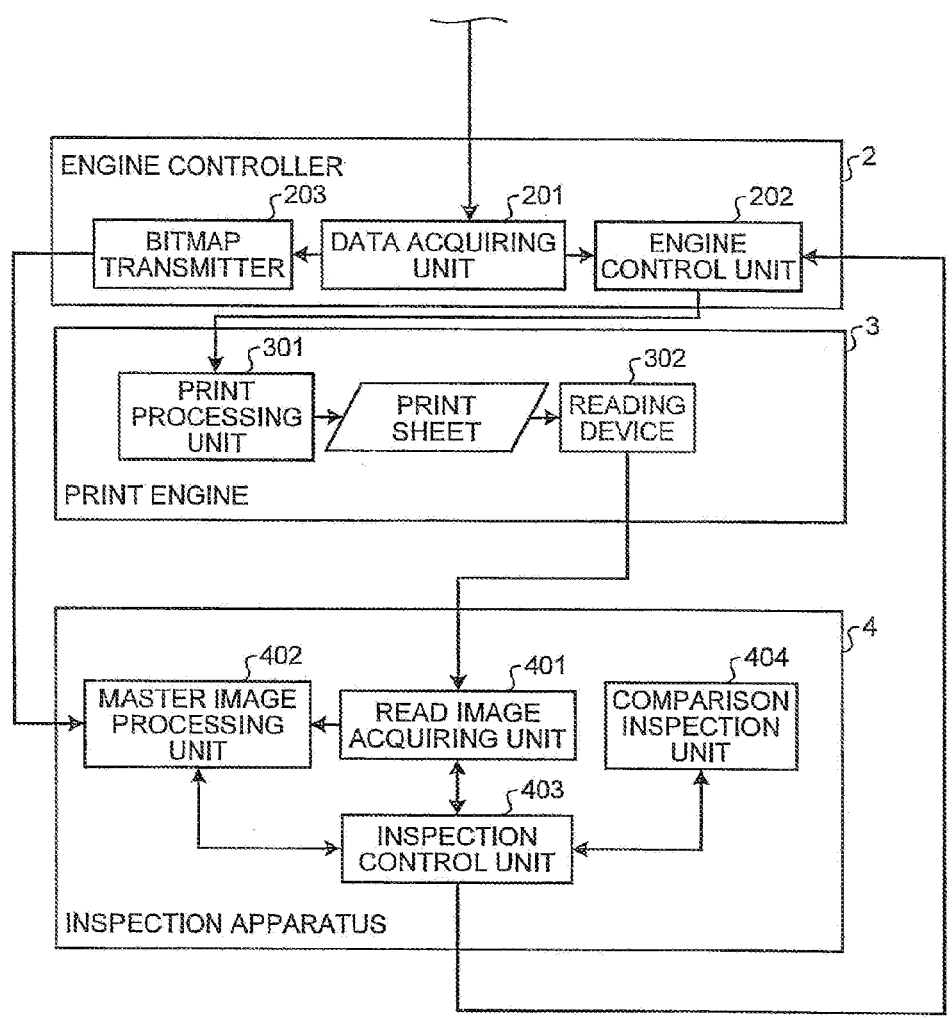
FIG. 3 is a block diagram illustrating the functional structure of an engine controller, a print engine, and the inspection apparatus according to the embodiment of the present invention.

FIG. 3 is a block diagram illustrating the functional structure of the engine controller 2, the print engine 3, and the inspection apparatus 4 according to the embodiment. As illustrated in FIG. 3, the engine controller 2 according to the embodiment includes a data acquiring unit 201, an engine control unit 202, and a bitmap transmitter 203. The print engine 3 includes a print processing unit 301 and a reading device 302. The inspection apparatus 4 includes a read image acquiring unit 401, a master image processing unit 402, an inspection control unit 403, and a comparison inspection unit 404.

The data acquiring unit 201 obtains bitmap data input from the DFE 1 and activates the engine control unit 202 and the bitmap transmitter 203. Bitmap data is information of pixels included in an image to be formed and output. The engine control unit 202 controls the print engine 3 to form images and output them based on the bitmap data transferred from the data acquiring unit 201. The bitmap transmitter 203 transmits the bitmap data obtained by the data acquiring unit 201 to the inspection apparatus 4.

The print processing unit 301 is an image forming unit that obtains the bitmap data input from the engine controller 2, forms images and outputs them on print sheets, and outputs the printed sheets. The print processing unit 301 according to the embodiment is achieved with a typical electrophotography image forming mechanism, and is also achieved with another type of image forming mechanism such as an inkjet image forming mechanism. The reading device 302 is an image scanning unit that reads the images formed on the print sheets printed and output by the print processing unit 301, and outputs the read data to the inspection apparatus 4. The reading device 302 is a line scanner provided on a feed path for the print sheets output by the print processing unit 301, for example. The reading device 302 scans the print sheets being conveyed and reads the images formed on the sheets.

Figure 4:
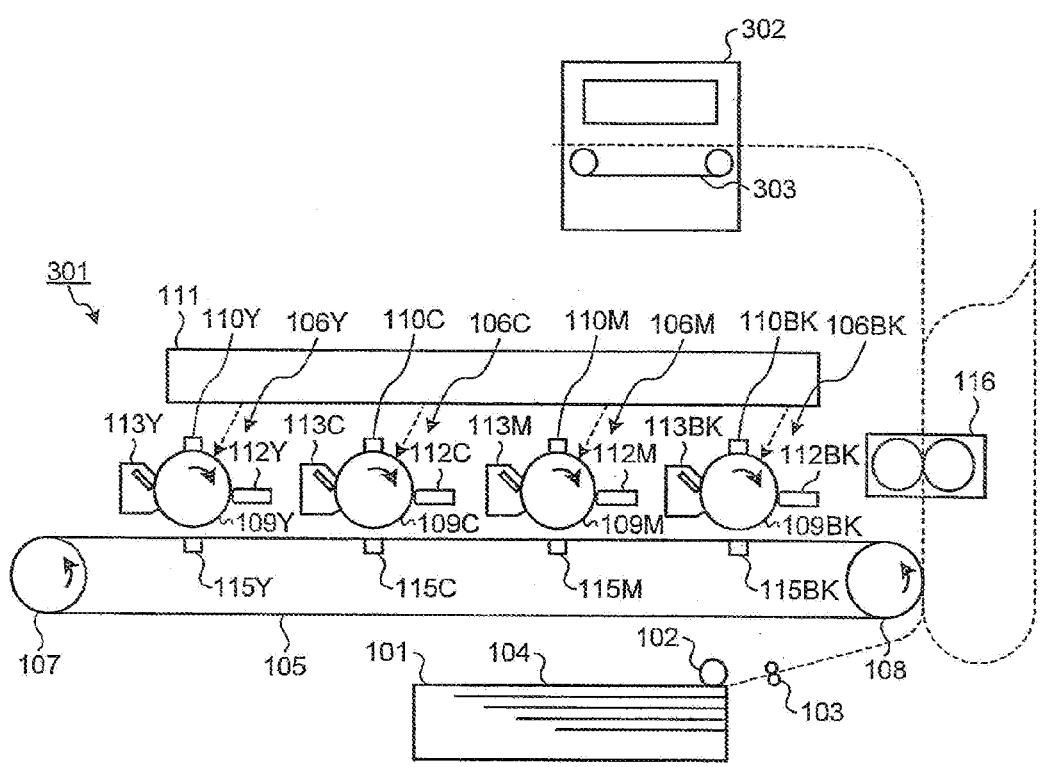
FIG. 4 is a chart illustrating the mechanical structure of a print processing unit according to the embodiment of the present invention.

The following describes the mechanical structure of the print processing unit 301 and the reading device 302 with reference to FIG. 4. As illustrated in FIG. 4, the print processing unit 301 according to the embodiment has a structure in which image forming units 106 for respective colors are provided side by side along a carriage belt 105 serving as an endless carriage unit. That is, the print processing unit 301 is called a tandem-type unit. More specifically, a plurality of image forming units (electrophotography processing units) 106BK, 106M, 106C, and 106Y are provided side by side along the carriage belt 105 in this order from the upstream side in the sheet conveying direction of the carriage belt 105. The carriage belt 105 serves as an intermediate transfer belt on which intermediate transfer images are formed. The intermediate transfer images are transferred to a sheet (an example of a recording medium) 104 that is fed by being separated from the sheets in the paper feed tray 101 by a paper feeding roller 102 and a separating roller 103.

The image forming units 106BK, 106M, 106C, and 106Y have the same internal structure except for different colors to form respective color toner images. The image forming unit 106BK forms black images, the image forming unit 106M forms magenta images, the image forming unit 106C forms cyan images, and the image forming unit 106Y forms yellow images. The following describes in detail the image forming unit 106BK only. The components of other image forming units 106M, 106C, and 106Y are illustrated in the charts with the respective symbols M, C, and Y substituting BK and the explanation thereof is omitted. This is because the image forming units 106M, 106C, and 106Y have the same structure as the image forming unit 106BK.

The carriage belt 105 is an endless belt bridged over a driving roller 107 and a driven roller 108. The driving roller 107 is driven to rotate by a not-illustrated driving motor. The driving motor, the driving roller 107, and the driven roller 108 function together as a driving roller to move the carriage belt 105 serving as an endless carriage unit.

In image-forming processing, the first image forming unit 106BK transfers black toner images onto the carriage belt 105 driven to rotate. The image forming unit 106BK includes a photosensitive drum 109BK as a photosensitive element, a charger 110BK provided around the photosensitive drum 109BK, an optical writing device 200, a developing unit 112BK, a photosensitive element cleaner (not illustrated), and a neutralizer 113BK. The optical writing device 200 irradiates the respective photosensitive drums 109BK, 109M, 109C, and 109Y (hereinafter, collectively referred to as the photosensitive drum 109) with light.

In image-forming processing, the outer circumference surface of the photosensitive drum 109BK is uniformly charged by the charger 110BK in a dark environment, and then optical writing is performed on the outer circumference surface of the photosensitive drum 109BK with light from a light source of the optical writing device 200 corresponding to black images. This forms electrostatic latent images for black images. The developing unit 112BK visualizes the electrostatic latent images for black images using black toner, whereby black toner images are formed on the photosensitive drum 109BK.

The toner images are transferred onto the carriage belt 105 by the transfer unit 115BK at the position where the photosensitive drum 109BK comes in contact with or comes closest to the carriage belt 105 (the transfer position). This transfer forms images with black toner onto the carriage belt 105. After transferring the toner images, the photosensitive drum 109BK is cleaned by the photosensitive element cleaner to remove unwanted toner remaining on the outer circumference surface thereon, electrically neutralized by the neutralizer 113BK, and then stands by for the subsequent image formation.

As described above, the black toner images transferred by the image forming unit 106BK onto the carriage belt 105 are conveyed to the subsequent image forming unit 106M by the carriage belt 105 driven to rotate by the rollers. In the image forming unit 106M, magenta toner images are formed on the photosensitive drum 109M by the same process as the image forming process of the image forming unit 106BK and the magenta toner images are superimposed on the already-formed black images and transferred onto the carriage belt 105.

The black images and magenta images transferred onto the carriage belt 105 are further conveyed to the subsequent image forming units 106C and 106Y. With the same operations as described above, cyan toner images are formed on the photosensitive drum 109C and yellow toner images are formed on the photosensitive drum 109Y. The cyan toner images and the yellow toner image are sequentially superimposed on the already-transferred images and transferred thereon. In such a manner, full-color intermediate transfer images are formed on the carriage belt 105.

The sheet 104 stored in the paper feed tray 101 is sequentially fed from the topmost sheet. At the position where the feed path for the sheet 104 comes in contact with or comes closest to the carriage belt 105, intermediate transfer images formed on the carriage belt 105 are transformed onto the sheet 104. This forms images on the surface of the sheet 104. The sheet 104 on the surface of which images have been formed are further conveyed. After the images are fixed on the sheet 104 by the fixing unit 116, the sheet 104 is conveyed to the reading device 302.

In the reading device 302, a document is conveyed by a carriage belt 303 and the surface of the document is captured by a line scanner provided inside the reading device 302, thereby generating a read image. The reading device 302 according to the embodiment reads the targeted document end to end without missing any area. That is to say, the reading device 302 reads the document in a larger area than the size of the targeted document, thereby generating a larger size image than the size of the targeted document.

For duplex printing, the sheet on which images are fixed are conveyed to a reverse path, then reversed and conveyed again to the transfer position. The sheet on one side or both sides of which images are formed and fixed is conveyed to the reading device 302. One side of the sheet is then captured by the reading device 302, thereby generating a read image serving as a targeted image for inspection.

The following describes the components of the inspection apparatus 4 with reference to FIG. 3. The read image acquiring unit 401 obtains information of the read image generated by the reading device 302 by reading the surface on the print sheets in the print engine 3. The information of the read image obtained by the read image acquiring unit 401 is input to the comparison inspection unit 404 for comparison inspection. The input of the read image to the comparison inspection unit 404 is performed under control of the inspection control unit 403.

Specifically, the inspection control unit 403 obtains the read image and then inputs the read image to the comparison inspection unit 404.

The master image processing unit 402, as described above, obtains the bitmap data input from the engine controller 2 and generates a master image serving as an image for inspection to be compared with the targeted image for inspection. In other words, the master image processing unit 402 functions as an inspection reference image generating unit that generates a master image serving as an inspection reference image used for inspecting the read image, based on the targeted image for output. The generating processing of the master image by the master image generation unit 203 will be described in detail later.

The inspection control unit 403 is a control unit that controls operations of the inspection apparatus 4 totally. The components included in the inspection apparatus 4 operate under the control of the inspection control unit 403. The comparison inspection unit 404 is an image inspection unit that compares the read image input from the read image acquiring unit 401 with the master image generated by the master image processing unit 402, and determines whether an image formation and output is performed as intended. The comparison inspection unit 404 includes an ASIC as described above for processing a large amount of calculation at high speed.

Figure 5:
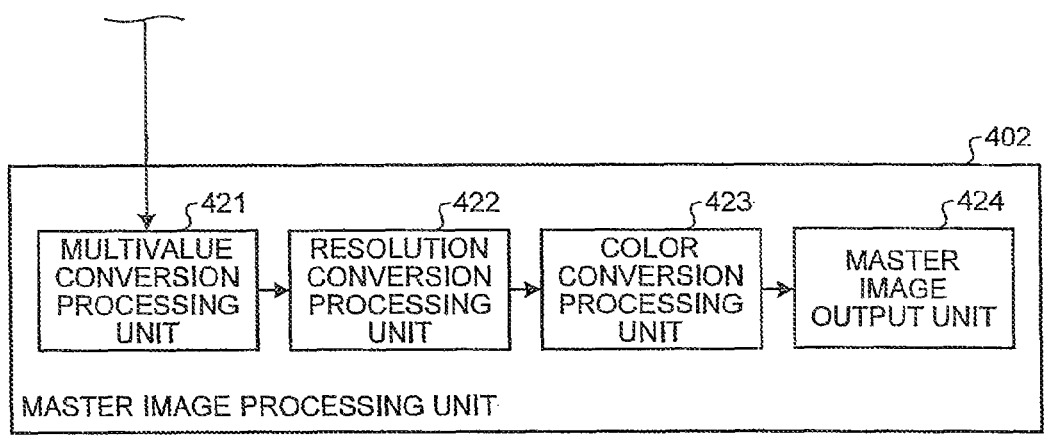
FIG. 5 is a block diagram illustrating the functional structure of a master image processing unit according to the embodiment of the present invention.

The following describes detailed functions included in the master image processing unit 402 with reference to FIG. 5. FIG. 5 is a block diagram illustrating the internal structure of the master image processing unit 402. As illustrated in FIG. 5, the master image processing unit 402 includes a multivalue conversion processing unit 421, a resolution conversion processing unit 422, a color conversion processing unit 423, and a master image output unit 424. The master image processing unit 402 according to the embodiment is achieved by the specialized device 80 illustrated in FIG. 2, that is, the hardware achieved as an ASIC, operating under the control of the software. The comparison inspection unit 404 and the master image processing unit 402, both of which include an ASIC as described above, can also be achieved with software modules implemented by the CPU 10.

The multivalue conversion processing unit 421 performs multivalue conversion processing on binary images in which each image pixel is expressed in chromatic or achromatic color (e.g., black or white, magenta or white) or small value images in which each image pixel is expressed with two bits, thereby generating multivalue images. The bitmap data according to the embodiment is information to be input to the print engine 3. The print engine performs image formation and output based on binary images of respective colors, i.e., cyan, magenta, yellow, and black (CMYK). Therefore, binary images of respective colors or the prior level images, that is, small value images such as four-bit images are input to the master image processing unit 402. By contrast, the read images, i.e., the targeted images for inspection are multivalue images including multi-tone of red, green, blue (RGB), that is, the three primary colors. Binary images or small value images are therefore first converted into multivalue images by the multivalue conversion processing unit 421. Examples of multivalue images include images in which each image pixel is expressed with eight bits for respective CMYK colors.

In the embodiment, the print engine 3 performs image formation and output based on binary images of respective CMYK colors and the master image processing unit 402 includes the multivalue conversion processing unit 421. The embodiment, however, is not limited to this example. If the print engine 3 performs image formation and output based on multivalue images, the multivalue conversion processing unit 421 can be omitted.

The resolution conversion processing unit 422 performs resolution conversion on multivalue images generated by the multivalue conversion processing unit 421 so as to match the resolution of the read image i.e., the targeted image for inspection. In the embodiment of the present invention, the reading device 302 generates read images having a resolution of 200 dot per inch (dpi), therefore the resolution conversion processing unit 422 converts the resolution of multivalue images generated by the multivalue conversion processing unit 421 to 200 dpi.

The color conversion processing unit 423 obtains the resolution-converted image by the resolution conversion processing unit 422 and performs color conversion on the obtained image. As described above, the read image according to the embodiment is formed in RGB format, thus the color conversion processing unit 423 converts the image in CMYK format after being resolution-converted by the resolution conversion processing unit 422 into RGB format. As a result, a multivalue image is generated in which each image pixel is expressed with eight bits for respective RGB colors (twenty four bits in total) with a resolution of 200 dpi.

The master image output unit 424 outputs the master image generated by the multivalue conversion processing unit 421, the resolution conversion processing unit 422, and the color conversion processing unit 423 to the inspection control unit 403. The inspection control unit 403 controls the comparison inspection unit 404 to perform image comparison processing based on the master image obtained from the master image processing unit 402, and obtains the comparison result.

The comparison inspection unit 404 compares, as described above, the read image in which each image pixel is expressed with eight bits for respective RGB colors with a resolution of 200 dpi with the respective corresponding pixels of the master image. The comparison inspection unit 404 then calculates the difference values between the read image in which each image pixel is expressed with eight bits for respective RGB colors with a resolution of 200 dpi and the master image for each pixel. The comparison inspection unit 404 determines the presence of any defect in the read image based on the magnitude relation between the calculated difference values and a threshold.

The comparison inspection unit 404 compares the difference values and the threshold in the following manner: the comparison inspection unit 404 sums up the difference values calculated for each pixel in a predetermined range, and compares the total value and the threshold that has been set. The predetermined range used for summing up the difference values for each pixel has an area of three dots by three dots, for example.

Figure 16:
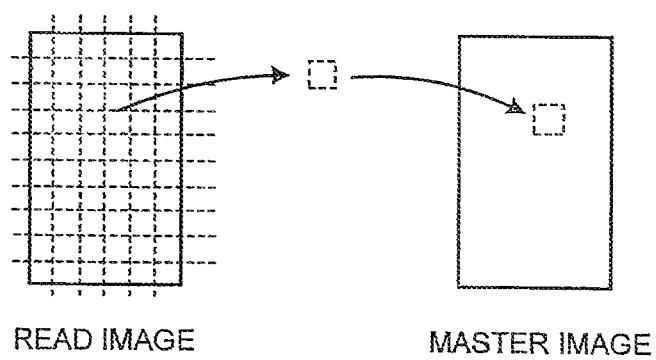
FIG. 16 is a chart illustrating a mode of image comparison inspection according to an embodiment of the present invention.

When comparing the read image with the master image, the comparison inspection unit 404 superimposes the read image segmented in the predetermined range on the master image corresponding to the segmented range as illustrated in FIG. 16 to calculate the difference of pixel values, that is, the difference values of the intensity between the pixels. The comparison inspection unit 404 then shifts the segmented range in the read image to be superimposed on the corresponding area in the master image in the vertical and horizontal directions to determine the position where the calculated difference value is the smallest as a correct superimposed position and use the calculated difference value as the comparison result. The individual segments defined with a grid as illustrated in FIG. 16 represent the predetermined range in which the above-described difference values of the pixels are summed up.

Another example may include determining whether each pixel is defective based on the comparison result of each calculated difference value between the pixels with a threshold and subsequently comparing the count number of the pixels determined as defective with the corresponding threshold.

In such a system, the summary of the embodiment according to the present invention is as follows: add the area outside of a document included in the end area of the read image generated by the reading device 302 (hereinafter, referred to as the outside-of-document area) to the master image in the above-described comparison processing performed by the inspection apparatus 4, thereby matching the size of the read image and the size of the master image, and simplify determination of the outside-of-document area in difference calculation processing on the images. The following describes the functions and operations of the inspection control unit 403 according to the embodiment.

Figure 6:
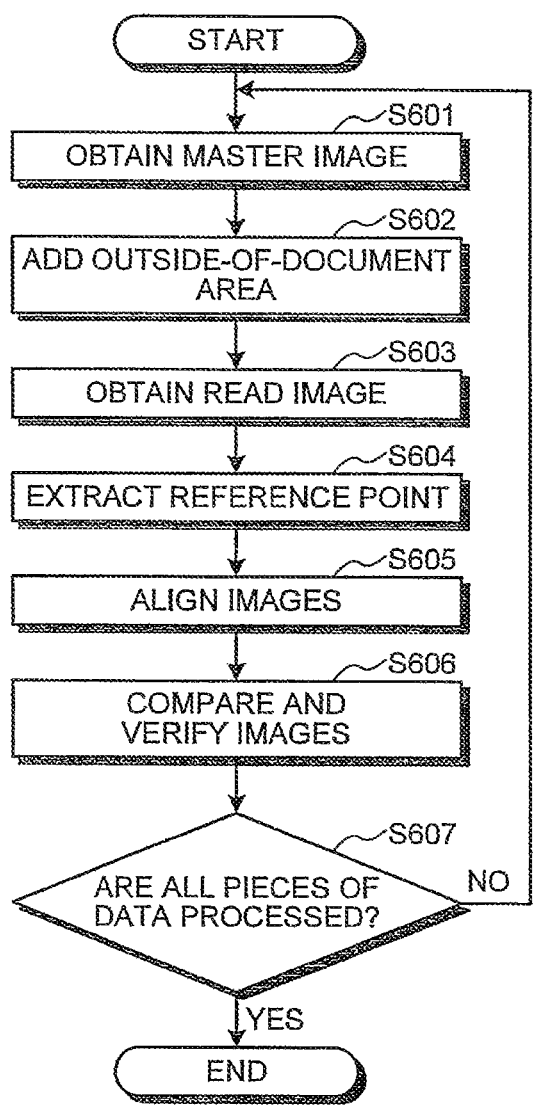
FIG. 6 is a flowchart illustrating operations of the whole of comparison inspection according to the embodiment of the present invention.
Figure 7:
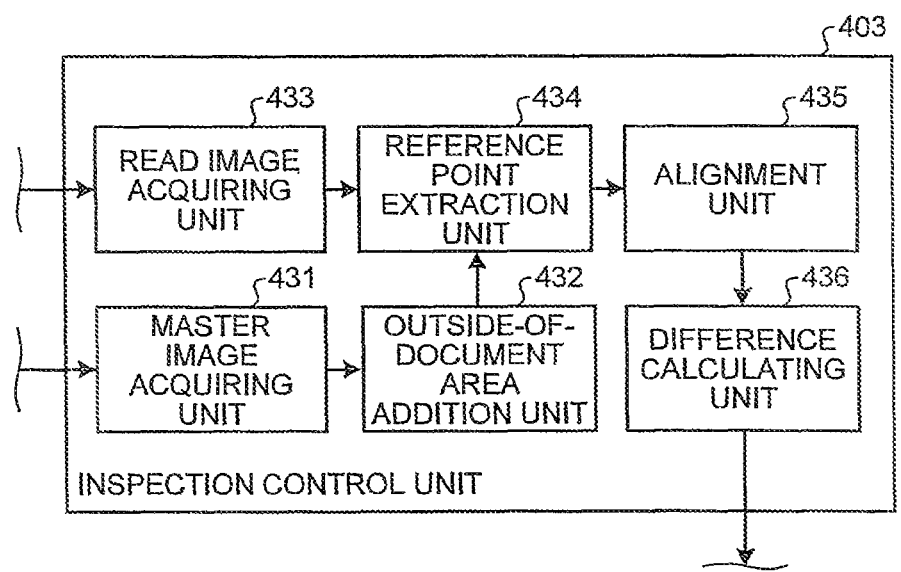
FIG. 7 is a block diagram illustrating the functional structure of an inspection control unit according to the embodiment of the present invention.

FIG. 6 is a flowchart illustrating operations of the inspection control unit 403 and the comparison inspection unit 404 according to the embodiment of the present invention. FIG. 7 is a block diagram illustrating the functional structure of the inspection control unit 403 according to the embodiment. As illustrated in FIG. 6, in the inspection control unit 403, firstly a master image acquiring unit 431 obtains the master image generated by the master image processing unit 402 (S601), and then an outside-of-document area addition unit 432 adds an image of the above-described outside-of-document area to the master image therearound (S602).

Image information of the outside-of-document area added to the master image at S602 includes information with which it can be determined that the pixel is in the outside-of-document area depending on the content of the pixel in the image. Pixels in the image include value information indicating the intensity of respective red, green, and blue (RGB) colors. The smaller the value is, the closer to black the color is, and the larger the value is, the closer to white color is. If the reading device 302 reads a black image, it seldom occurs that the respective values for RGB colors indicate (R, G, B)=(0, 0, 0), i.e., the lightness of the image is the lowest.

The outside-of-document area addition unit 431 according to the embodiment therefore generates an image of the outside-of-document area, in which the pixel values of the pixel indicate (R, G, B)=(0, 0, 0), and adds the image to the master image. This enables the comparison inspection unit 404 in its comparison inspection to determine that the pixels are in the outside-of-document area based on the pixel values.

For another example, extremely small values can be used like (R, G, B)=(1,1,1), rather than (R, G, B)=(0, 0, 0). In this example, the comparison inspection unit 404 determines that the pixel is in the outside-of-document area, when the pixel values for the respective colors are smaller than predetermined thresholds.

The outside-of-document area addition unit 432 may add the outside-of-document area including pixels having negative pixel values to the master image, if it is permitted that the pixel values for respective colors have negative value as information. It should be noted that actual pixel values in the read image have only positive values. This also enables the comparison inspection unit 404 to determine that the pixels are in the outside-of-document area in its comparison inspection, based on the pixel values, in the same manner as describes above.

Another image data may be used in which an auxiliary plane is used in addition to the three planes, RGB. If a predetermined value is assigned in the auxiliary plane, this also enables the comparison inspection unit 404 to determine that the pixels are in the outside-of-document area in its comparison inspection, based on the pixel values.

As described above, in the inspection apparatus 4 according to the embodiment, the outside-of-document area is added to the master image for matching the size of the read image and the size of the master image to enable the comparison inspection unit 404 achieved as an ASIC to perform image comparison. The comparison result of the pixel values in the outside-of-document area is ignored to prevent that the difference between the read image and the master image in the outside-of-document area is extracted as a defect of the image. The outside-of-document area addition unit 432 generates the outside-of-document area using pixel values with which it can be determined that the pixels are in the outside-of-document area and adds the outside-of-document area to the master image, as described above.

Figure 8A:
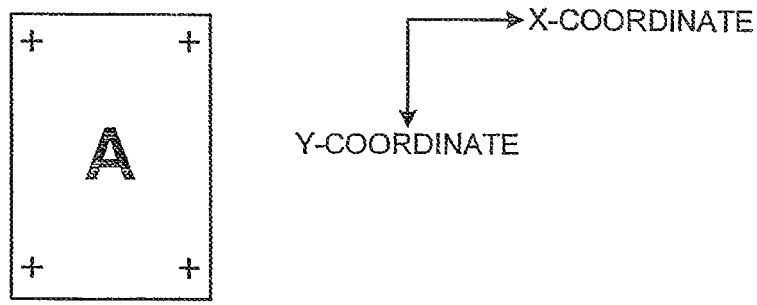
FIGS. 8A and 8B are charts illustrating a piece of print data and a read image according to the embodiment of the present invention.
Figure 8B:
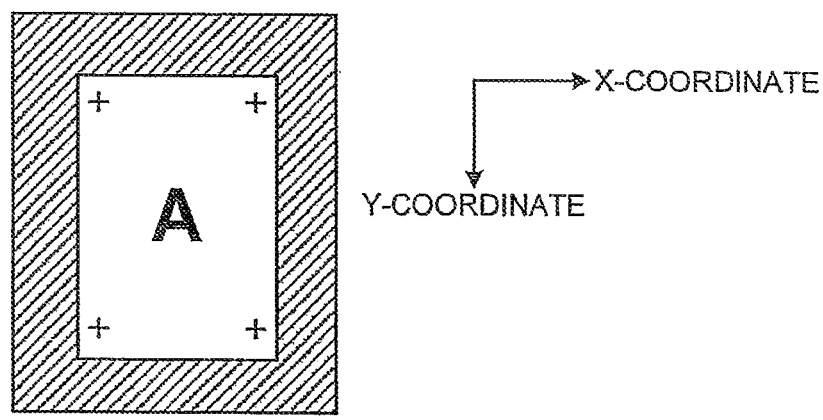

FIG. 8A is a chart illustrating the master image before the outside-of-document area is added and, FIG. 8B is a chart illustrating the master image after the outside-of-document area is added. The read image generated by the reading device 302 is illustrated in FIG. 8B. In the read image, the outside-of-document area indicated with hatched lines as illustrated in FIG. 8B has a color of the carriage belt 303 that conveys the document inside the reading device 302.

When the outside-of-document area addition unit 432 adds the outside-of-document area to the master image, the read image acquiring unit 433 obtains the read image from the read image acquiring unit 401 (S603) and the reference point extraction unit 434 extracts reference points from the master image to which the outside-of-document area is added and the read image (S604). The reference points are the marks on the four corners in the area of the targeted document for image formation and output, (hereinafter, referred to as the inside-of-document area) as illustrated in FIGS. 8A and 8B. If no mark illustrated in FIGS. 8A and 8B is provided, any pixel suitable for such marks may be extracted from the images by using a corner extraction filter or other image filters.

When the reference point extraction unit 434 extracts the reference points from the Master image and the read image, the alignment unit 435 aligns the images based on the positions of the reference points in the respective images, i.e., coordinates on the images including X-coordinates and Y-coordinates as illustrated in FIGS. 8A and 8B (S605), and the difference calculating unit 436 compares and verifies the aligned images (S606). At S605 and S606, the alignment unit 435 and the difference calculating unit 436 make the comparison inspection unit 404 perform comparison calculation processing on the images and obtain the result of the processing, thereby performing processing. In other words, at S606, the difference calculating unit 436 and the comparison inspection unit 404 work together to function as an image inspection unit.

The inspection control unit 403 repeats such processing for the number of pages of the image to be printed out, i.e., the number of pieces of generated data of the master image and the number of pieces of generated data of the read image (No at S607). When all pieces of data have been processed (Yes at S607), the processing ends.

Figure 9:
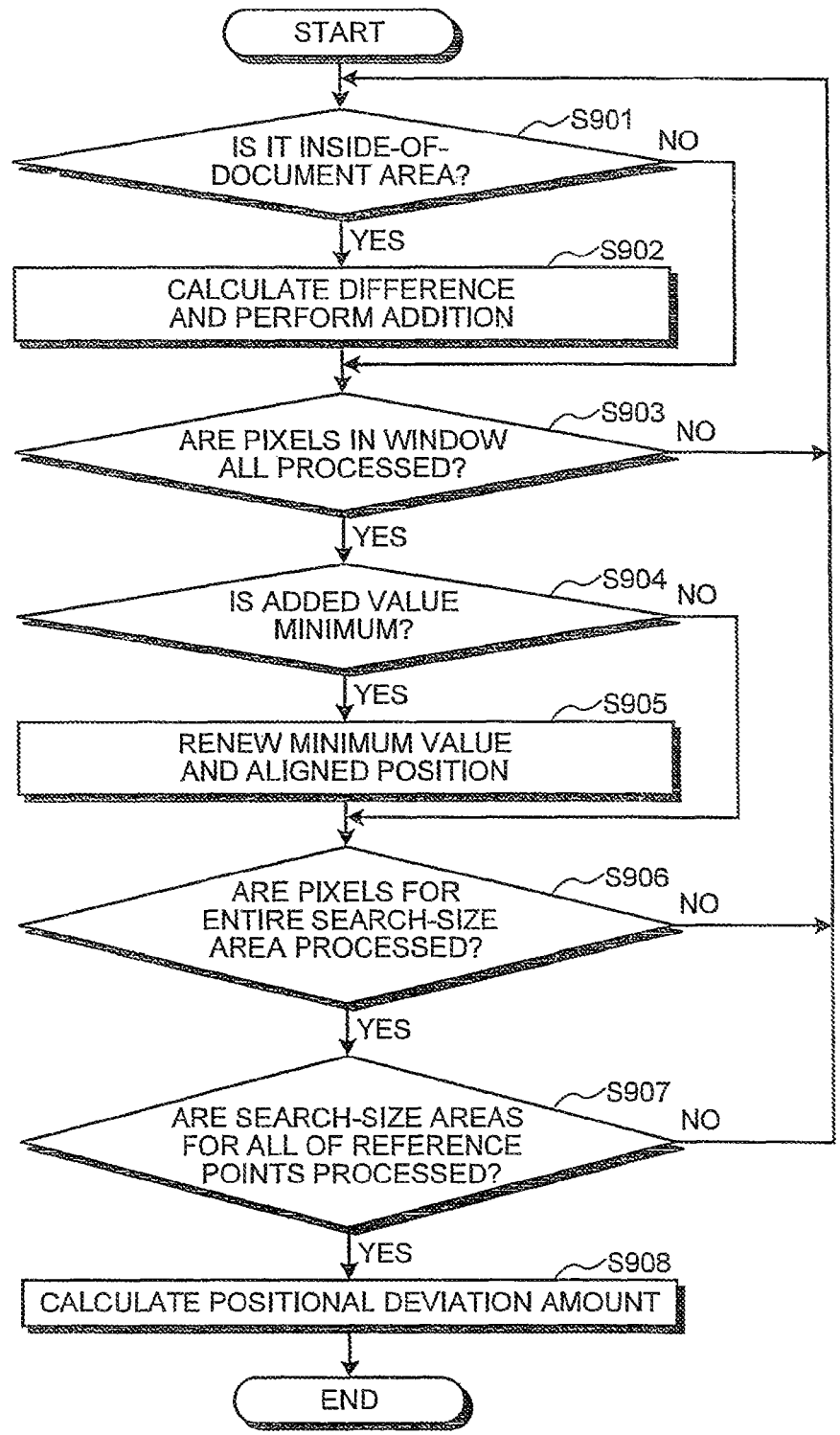
FIG. 9 is a flowchart illustrating alignment operations according to the embodiment of the present invention.

The following describes alignment processing at S605 in detail. FIG. 9 is a flowchart illustrating the detailed alignment processing at S605. When performing the processing illustrated in FIG. 9, the alignment unit 435 refers to the reference points extracted by the reference point extraction unit 434 from the master image and the read image. The alignment unit 435 then extracts parts of the images in a predetermined range around the reference points and inputs them to the comparison inspection unit 404. The predetermined range used for the extraction has an area of a total of 100 pixels consisting of 10 pixels in the vertical direction by 10 pixels in the horizontal direction, for example. Such an area is called a "window" because a part of the image is extracted.

The comparison inspection unit 404, to which a part of the master image and a part of the read image in the predetermined range are input, refers to the respective pixel values on the master image, and determines whether it is the inside-of-document area (S901). As a result of the determination at S901, as described above, determination based on pixel values is performed such as whether the pixel values for each pixel indicate (R, G, B)=(0, 0, 0), whether the pixel values for each pixel indicate negative values, or whether the auxiliary plane value indicates a predetermined value.

If the pixel values for each pixel indicate that it is the inside-of-document area (Yes at S901), the comparison inspection unit 404 calculates the difference values between the pixels of the master image and the pixels of the read image, and adds the difference values to the difference values of other pixels (S902). By contrast, if the pixel values for each pixel indicate that the pixels are in the outside-of-document area (No at S901), the calculation of the difference values and the addition processing are omitted.

The alignment unit 435 makes the comparison inspection unit 404 perform processing at S901 and S902 for all of the input pixels, i.e., the pixels in the window (No at S903). When the pixels in the window have been all processed (Yes at S903), the processing at one shift position ends. The processing at one shift position corresponds to calculation processing on the difference values at a time during repetition of calculation processing on the difference values performed by the alignment unit 435 while shifting the range of the window extracted from the read image.

The alignment unit 435 then shifts the range of the window for extraction from the read image and repeats the processing at S901 and S902. The range for repeating the processing means a search-size area. For example, the alignment unit 435 shifts the range of the window for extraction by ±20 pixels in the vertical direction and ±20 pixels in the horizontal direction. That is to say, the processing is repeated on an area of 50 pixels in the vertical direction by 50 pixels in the horizontal direction surrounding the area of 10 pixels in the vertical direction by 10 pixels in the horizontal direction around the reference point extracted in the read image.

More specifically, the alignment unit 435 according to the embodiment superimposes the area of the read image including 10 pixels in the vertical direction by 10 pixels in the horizontal direction around the reference point extracted in the read image onto the above-described search-size area, that is, the area of 50 pixels in the vertical direction by 50 pixels in the horizontal direction around the reference point extracted in the read image, while shifting the area of the read image by one pixel at a time. In such a manner, the alignment unit 435 calculates the difference values between the read image and the master image for each pixel. The shift position where the smallest difference values are obtained is determined as the result of alignment.

Figure 10A:
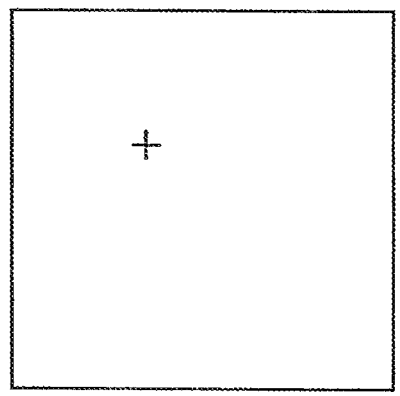
FIGS. 10A to 10C are charts illustrating detailed alignment processing in the alignment operations according to the embodiment of the present invention.
Figure 10B:
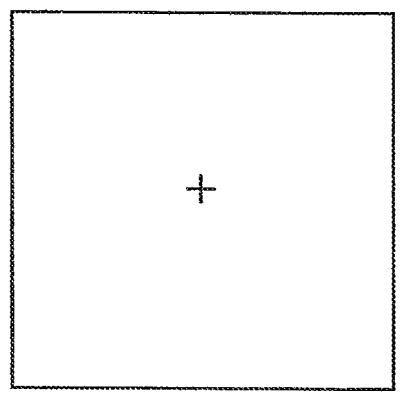
Figure 10C:
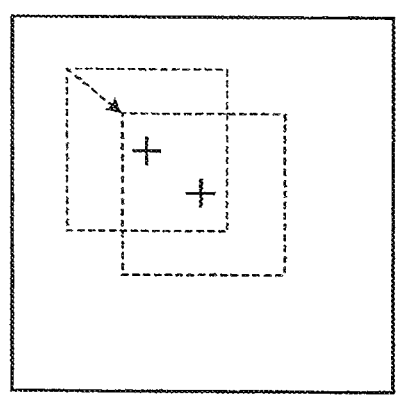

FIGS. 10A to 10C are charts illustrating the master image and the read image, and a mode in which the two images are superimposed. FIG. 10A is a chart illustrating a predetermined range of pixels in the master image and FIG. 10B is a chart illustrating the corresponding range of pixels in the read image. As illustrated in FIGS. 10A and 10B, the image position of the master image differs from that of the read image. Although only the reference points are illustrated in FIGS. 10A and 10B, the entire images are misaligned with each other.

FIG. 10C is a chart illustrating the size of the windows described above and a mode in which the master image and the read image are superimposed on each other by shifting the image(s). As illustrated with dashed lines in FIG. 10C, the alignment unit 435 extracts ranges of 10 pixels in the vertical direction by 10 pixels in the horizontal direction around the respective reference points as windows, and inputs them to the comparison inspection unit 404. The comparison inspection unit 404 then calculates the difference values of the pixels in the window of the master image and the corresponding pixels in the window of the read image.

After processing on a shift position, the alignment unit 435 determines whether the total value of the calculated difference values is the minimum value so far (S904). If the total value is the minimum value (Yes at S904), the alignment unit 435 stores the minimum value and the alignment position at that time, i.e., the shift amount of pixels in the vertical and horizontal directions between the master image and the read image (S905). After the processing at S905 ends or if the total value is not the minimum value (No at S904), the alignment unit 435 determines whether the pixels in the above-described search-size area, i.e., the area of the 50 pixels in the vertical direction by 50 pixels in the horizontal direction have been all processed (S906).

As a result of the determination at S906, if the pixels for the entire search-size area have not been processed (No at S906), the alignment unit 435 repeats the processing from S901. If the pixels for the entire search-size area have been processed (Yes at S906), the alignment unit 435 then determines whether the search-size areas for all of the reference points have been processed (S907).

As a result of the determination at S907, if the search-size areas for all of the reference points have not been processed (No at S907), the alignment unit 435 repeats the processing from S901. If the search-size areas for all of the reference points have been processed (Yes at S907), the alignment unit 435 calculates the positional deviation amount of the entire image based on the positional deviation amounts calculated for respective reference points (S908), and the processing ends. Through such processing, the alignment processing by the alignment unit 435 according to the embodiment is completed.

Through the processing described above, as illustrated in FIGS. 8A and 8B, the positional deviation amounts between a reference point in the master image and a reference point in the read image can be calculated for all of the reference points displayed at the four corners in both the master image and the read image. In the processing at S908, the alignment unit 435 calculates the skew angle of the image based on the positional deviation amounts between the reference point at the upper left and the reference point at the upper right, between the reference point at the lower left and the reference point at the lower right out of the calculated positional deviation amounts at the four corners. The alignment unit 435 also calculates the magnification rate based on the positional deviation amounts between the reference point at the upper left and the reference point at the lower left, between the reference point at the upper right and the reference point at the lower right.

The positional deviation amount for each pixel can also be calculated using linear interpolation based on the positional deviation amount of respective reference points. When calculating the positional deviation amount using the linear interpolation, the calculation may be performed for each pixel included in the image, which requires a large amount of calculation. The positional deviation amount, however, can be calculated for each segmented area obtained by segmenting the image in the vertical and horizontal directions. In this example, the positional deviation amount of the segmented areas including the reference points is determined as the positional deviation amount of the reference points calculated in the processing illustrated in FIG. 9. The positional deviation amount of other segmented areas can be obtained using the linear interpolation.

Figure 11:
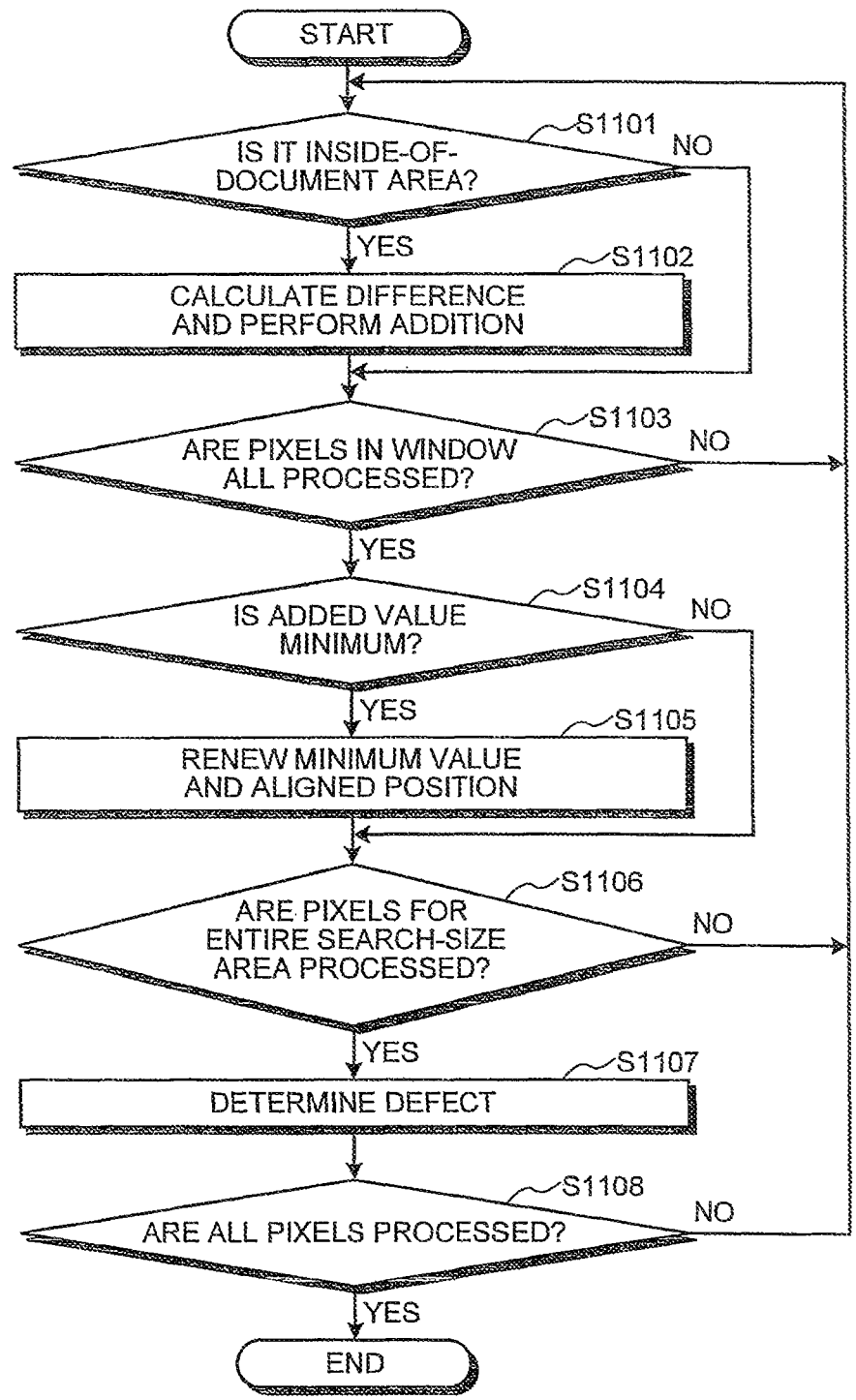
FIG. 11 is a flowchart illustrating operations of the comparison inspection according to the embodiment of the present invention.

The following describes detailed comparison and verification processing at S606 illustrated in FIG. 6. FIG. 11 is a flowchart illustrating operations of the comparison and verification processing at S606. The comparison and verification processing is performed, in principle, in the same manner as the alignment processing illustrated in FIG. 9. Specifically, as illustrated in FIG. 10C, the difference values between the pixels in the master image and the corresponding pixels in the read image are calculated while shifting the image(s). The windows used in the comparison and verification processing are smaller than windows used for the alignment processing. For example, the windows used in the comparison and verification processing have an area of a total of nine pixels consisting of three pixels in the vertical direction by three pixels in the horizontal direction. Specifically, the difference extraction unit 436 extracts pixel information of an area of a total of nine pixels consisting of three pixels in the vertical direction by three pixels in the horizontal direction from both the master image and the read image, and inputs the extracted pixel information to the comparison inspection unit 404.

The comparison inspection unit 404, to which pixel information of the master image and pixel information of the read image in the predetermined range are input, refers to the respective pixel values on the master image, and determines whether it is the inside-of-document area (S1101). As a result of the determination at S1101, determination based on pixel values is performed such as whether the pixel values for each pixel indicate (R, G, B) =(0, 0, 0), whether the pixel values for each pixel indicate negative values, or whether the auxiliary plane value indicates a predetermined value.

IF the pixel values for each pixel indicate that it is the inside-of-document area (Yes at S1101), the comparison inspection unit 404 calculates the difference values between the pixels of the master image and the pixels of the read image, and adds the difference values to the difference values of other pixels (S1102). By contrast, if the pixel values for each pixel indicate that the pixels are in the outside-of-document area (No at S1101), the calculation of the difference values and the addition processing are omitted.

The difference calculating unit 436 makes the comparison inspection unit 404 perform processing at S1101 and S1102 for all of the input pixels, i.e., the pixels in the window (No at S1103). When the pixels in the window have been all processed (Yes at S1103), the processing at one shift position ends. The difference calculating unit 436 then shifts the range of the window for extraction from the read image and repeats the processing at S1101 and S1103. The range for repeating the processing means a search-size area. For example, the difference calculating unit 436 shifts the range of the window for extraction by ± three pixels in the vertical direction and ± three pixels in the horizontal direction. That is to say, the processing is repeated on an area of nine pixels in the vertical direction by nine pixels in the horizontal direction surrounding the area of three pixels in the vertical direction by three pixels in the horizontal direction according to the positional deviation amount determined by the operations illustrated in FIG. 9.

After processing on a shift position, the difference calculating unit 436 determines whether the total value of the calculated difference values is the minimum value (S1104). If the total value is the minimum value (Yes at S1104), the difference calculating unit 436 stores the minimum value and the alignment position at that time, i.e., the shift amount of pixels in the vertical and horizontal directions between the master image and the read image (S1105). After the processing at S1105 ends or if the total value is not the minimum value (No at S1104), the difference calculating unit 436 determines whether the pixels in the above-described search-size area, i.e., the area of the nine pixels in the vertical direction by nine pixels in the horizontal direction have been all processed (S1106).

As a result of the determination at S1106, if the pixels for the entire search-size area have not been processed (No at S1106), the difference calculating unit 436 repeats the processing from S1101. If the pixels for the entire search-size area have been processed (Yes at S1106), the difference calculating unit 436 then compares the minimum value of the calculated difference values with a predetermined threshold for determination of defect, thereby determining whether the read image in the range of the window corresponding to the window in the master image now being referred to is defective (S1107).

The threshold used for the comparison at S1107 is a value used for determining whether the image in the window is defective. If the difference values obtained from the comparison inspection unit 404 exceed the threshold, the difference calculating unit 436 determines that the image in the range of the window is defective. After the determination on the threshold, the difference calculating unit 436 determines whether all of the pixels have been processed, i.e., pixels have been extracted as windows and have been processed for the entire range of the master image (S1108). As a result of the determination at S1108, if the pixels in the window have not been processed (No at S1108), the difference calculating unit 436 repeats the processing from S1101. If the pixels for the entire range of the master image have been processed (Yes at S1108), the difference calculating unit 436 ends processing. Through the processing according to the embodiment described above, the comparison and verification processing by the difference calculating unit 436 is completed.

As described above, in the image inspection system according to the embodiment, when reading a document, a larger area is read than the size of the document in the vertical and horizontal directions for targeting the document end to end without missing any area for inspecting. In the embodiment, for matching the size of the master image to the size of the read image to streamline the comparison processing, a larger area is read than the size of the document and thus the area of the carriage belt 303 is read and displayed on the edges of the read image, which is added to the master image as an outside-of-document area.

In the comparison inspection, images in the outside-of-document area are compared and difference values are obtained for the pixel values. It is controlled so that the comparison result of the pixel values in the outside-of-document area is ignored to prevent that the difference between the read image and the master image in the outside-of-document area is extracted as a defect of the image, which actually requires no inspection and may cause reduction of the productivity of the image formation and output. For determining the outside-of-document area at high speed, when adding the outside-of-document area to the master image, the inspection apparatus 4 uses such pixel values with which it can be readily determined that the pixels are in the outside-of-document area. This prevents that the determination on the outside-of-document area requires a long time and the productivity of the image formation and output is reduced.

In the above-described embodiment, as illustrated in FIGS. 10A to 10C, the master image to which the outside-of-document area is added and the read image are aligned with each other and the outside-of-document area in the master image is excluded from the target for determination on defects. In addition, a master image without an outside-of-document area added thereto may be used to be aligned with a read image including an outside-of-document area, that is, an area of the carriage belt and determination on defects may be performed on only the pixels included in the master image itself. This can generate the same result as in the embodiment.

In this case, however, when the master image without an outside-of-document area added thereto is aligned with the read image, the initial positional relation for superimposition as illustrated in FIG. 10C needs to be set based on the outside-of-document area in the read image. For example, when the master image is aligned with the read image based on the upper left corners of the images as a standard for positional alignment, the upper left corner of the master image without an outside-of-document area added thereto corresponds to the upper left corner of the targeted image for output as illustrated in FIG. 8A, whereas the upper left corner of the read image including the outside-of-document area is in the area of the carriage belt as illustrated in FIG. 8B.

The positional alignment by aligning the images with each other while shifting the pixels one by one based on the upper left corners of both images as a standard for positional alignment requires repeated alignment and a huge amount of time until the correct superimposed position is obtained. By contrast, positional alignment starting with a state in which an outside-of-document area is added to the master image as illustrated in FIG. 8B can reduce the amount of calculation substantially because rough alignment has been already done thanks to the addition of the outside-of-document area.

Some specifications of ASICs included in the comparison inspection unit 404 assume that the sizes of two images to be compared with each other are the same. This also makes the comparison inspection performed after adding the outside-of-document area to the master image effective. In other words, the method according to the embodiment in which the pixels included in the outside-of-document area are identified and excluded from the target for determination on defects is especially effective when it is assumed that the sizes of the master image and the read image are aligned with each other.

In the embodiment described above, examples have been described in which the pixel values of the pixels included in the outside-of-document area for each pixel indicate (R, G, B)=(0, 0, 0), negative values, or a predetermined value is set to the auxiliary plane value. The embodiment, however, is not limited to these examples. The pixel values may be extracted from the end areas of the read image, i.e., the outside-of-document area and the pixels having the pixel values may be added to the outside-of-document area of the master image. In this example, in the determination at S901 illustrated in FIG. 9 or the determination at S1101 illustrated in FIG. 11, such pixels are determined as the pixels in the outside-of-document area that the difference of the pixel values and a certain pixel value that has been set is within a predetermined range.

Figure 12:
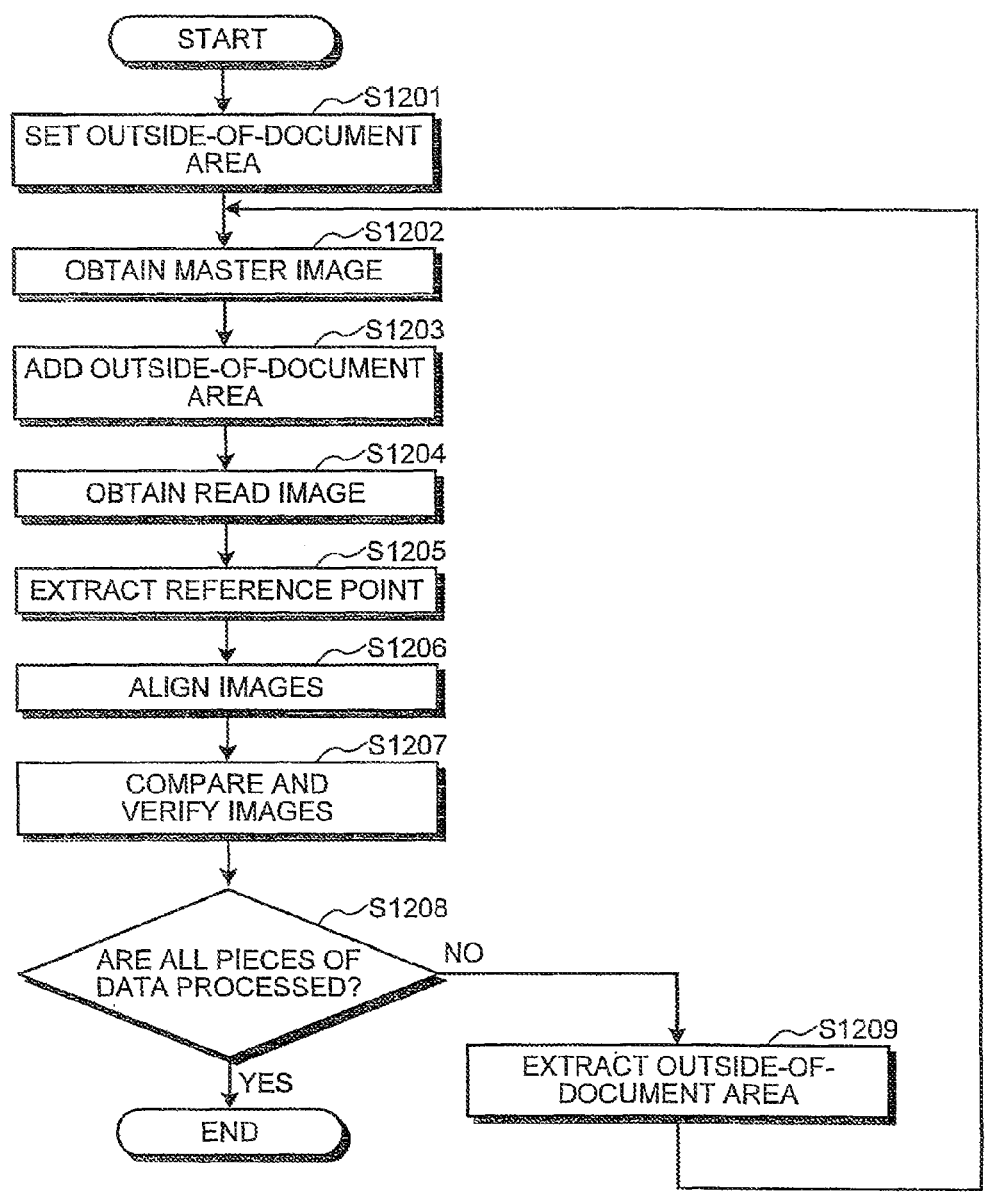
FIG. 12 is a flowchart illustrating operations of the whole of comparison inspection according to another embodiment of the present invention.

FIG. 12 is a flowchart illustrating operations of the inspection control unit 403 and the comparison inspection unit 404 when the pixel values extracted from the end area of the read image are used as the pixel values in the outside-of-document area. FIG. 12 corresponds to FIG. 6. The difference from the flowchart in FIG. 6 is that the comparison inspection unit 403 obtains an initial setting value for the outside-of-document area first (S1201).

The processing at S1201 is achieved by, for example, the read image acquiring unit 433 extracting pixel values from the end area of the obtained read image and inputting the extracted pixel values to the master image acquiring unit 431. For another example, operators may input a setting value manually at the start of operations. It should also be noted that the average value of a plurality of the pixel values may be used for the extracted pixel value rather than the pixel value of a certain pixel.

After the processing at S1201, from S1202 to S1208, the same processing is performed as the processing from S601 to S607 illustrated in FIG. 6. If all pieces of data have not been processed at S1208 (No at S1208), the inspection control unit 403 extracts a pixel value in the outside-of-document area of the read image obtained at that time, and determines the extracted pixel value as the pixel value in the outside-of-document area used for the inspection on the subsequent image (S1209). As described above, the pixel used for determination for the outside-of-document area is renewed at every inspection. This makes it possible to address the change of the intensity of the read image caused by the aging of the reading device 302, for example.

Figure 13A:
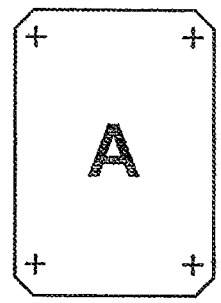
FIGS. 13A and 13B are charts illustrating a corner-missing image according to an embodiment of the present invention.
Figure 13B:
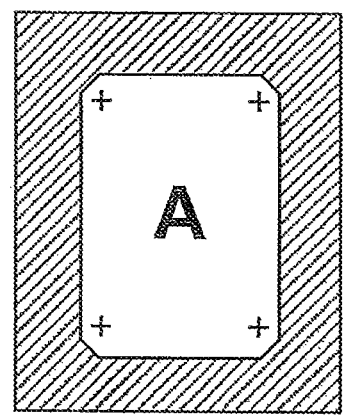

Use of the processing according to the embodiment makes it possible to readily detect any sheet crease on the four corners of the targeted document to be read. The following describes a mode in which any sheet crease is detected on the document in the image inspection system according to the embodiment. FIG. 13A is a chart illustrating a corner-missing image, i.e., image data in which four corners of the image are originally missing. For such corner-missing images, the read image is generated by the reading device 302 as illustrated in FIG. 13B.

Figure 14A:
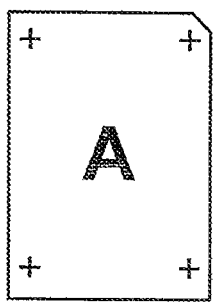
FIGS. 14A to 14C are charts illustrating a state in which a sheet is creased according to the embodiment of the present invention.
Figure 14B:
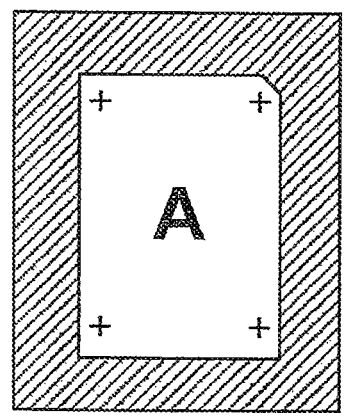

By contrast, FIG. 14A is a chart illustrating a state in which a sheet is creased in a corner thereof. The targeted image for output in this example is the same as the image illustrated in FIG. 8A. In this example, the read image is generated by the reading device 302 as illustrated in FIG. 14B. In the image inspection system according to the embodiment, if the read image illustrated in FIG. 13B is obtained, the four corners missing in the original image data is determined as in the outside-of-document area. The missing areas, therefore, are not erroneously detected as a defect.

Figure 14C:
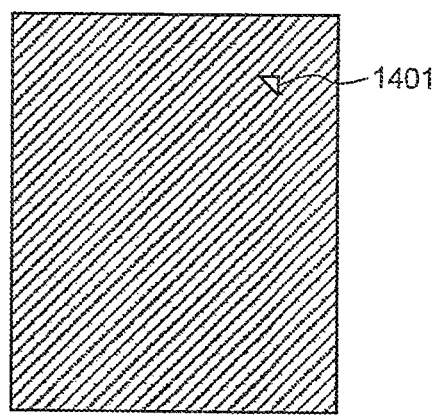

By contrast, if the read image illustrated in FIG. 14B is obtained, the outside-of-document area is indicated with hatched lines as illustrated in FIG. 8B. Accordingly, the corner area of the sheet as illustrated in FIG. 14C is detected as a defect 1401. On this occasion, the difference calculating unit 436 according to the embodiment can detect any sheet crease based on the defect 1401 illustrated in FIG. 14C. Such defects can be detected on the condition that the color of the carriage belt 303 conveying the document in the reading device 302 is obviously different from the ground color of the sheet, for example.

Typical ground color of sheets is white, a color like white, or a color with high brightness. By making the color of the carriage belt 303 black, a dark color like black, or a color with low brightness, therefore, any sheet crease as illustrated in FIG. 14C can be readily detected as a defect of the image. Making the color of the carriage belt 303 a dark color, may also prevent offset on sheets when the sheet is in a light color.

Figure 15:
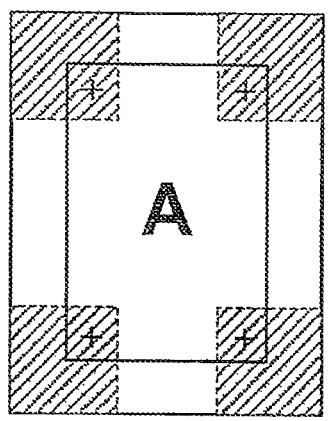
FIG. 15 is a chart illustrating detection areas for sheet creases according to another embodiment of the present invention.

To detect any crease on a sheet based on a defect as illustrated in FIG. 14C, a sheet crease detection area for detecting any sheet crease is determined in advance in a predetermined range in the four corners in images as indicated with hatched lines illustrated in FIG. 15. If any defect larger than a predetermined range is detected in any sheet crease detection area in the image, the difference calculating unit 436 determines that the sheet is creased.

With the mode as described above, any crease on sheets can be detected with the structure of the reading device 302 and the inspection apparatus 4 used for image comparison inspection. This eliminates the necessity of providing a separate specialized sensor for detecting any crease on a sheet, thereby readily detecting any crease on sheets.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image inspection apparatus configured to check a target image printed on a recording medium, the image inspection apparatus comprising:
   a memory having computer-readable instructions stored therein; and
   a processor configured to execute the computer-readable instructions to,
      generate a reference image from image data of the target image;
      obtain a first pixel value from the reference image;
      extract an image-printed area from a read image of the target image containing the recording medium on which the target image to be checked is printed and a conveying body conveying the recording medium;
      obtain a second pixel value from the image-printed area of the read image to be checked;
      generate an image of a non-image-printed area containing a third pixel value with which it can be determined that the third pixel value is associated with the non-image-printed area, the third pixel value being different from the first pixel value and the second pixel value;
      add the image of the non-image-printed area so as to surround the reference image on the periphery of the reference image with the non-image-printed area;
      compare respective pixel values of the read image and the reference image;
      determine whether each of the respective pixel values are associated with the image-printed area or the non-image-printed area;
      detect an error in the printed target image associated with the image-printed area in response to a difference between the first pixel value and the second pixel value being higher than a threshold value; and ignore an error in the printed target image associated with the non-image-printed area based on the third pixel value.

2. The image inspection apparatus set forth in claim 1, wherein the third pixel value represents the lowest brightness.

3. The image inspection apparatus set forth in claim 1, wherein the third pixel value is negative.

4. The image inspection apparatus set forth in claim 1, wherein the third pixel value includes a value that is preset in an auxiliary color plane out of a plurality of color planes in which the pixel value is set for each different color.

5. The image inspection apparatus set forth in claim 1, wherein the processor is configured to obtain the third pixel value from the target image of the conveying body.

6. The image inspection apparatus set forth in claim 5, wherein the third pixel value is used when a previous image is checked, and in case of sequentially checking a plurality of images, a subsequent image is checked with the third pixel value.

7. The image inspection apparatus set forth in claim 1, wherein upon detecting an error in a hold detection area defined on at least one corner of the reference image and the read image, the processor is configured to determine that the recording medium is folded.

8. An image inspection system comprising:
an image data forming unit configured to form image data of a target image to be printed;
an image data controller configured to receive the image data and control the image data;
a print processing unit connected to the image data controller and configured to print the target image according to the image data on a recording medium; and
an image inspection apparatus configured to check the target image printed on the recording medium and connected to the image data controller and the print processing unit, the image inspection apparatus including,
a memory having computer-readable instructions stored therein; and
a processor configured to execute the computer-readable instructions to,
generate a reference image from image data of the target image;
obtain a first pixel value from the reference image;
extract an image-printed area from a read image of the target image containing the recording medium on which the target image to be checked is printed and a conveying body conveying the recording medium;
obtain a second pixel value from the image-printed area of the read image to be checked;
generate an image of a non-image-printed area containing a third pixel value with which it can be determined that the third pixel value is associated with the non-image-printed area, the third pixel value being different from the first pixel value and the second pixel value;
add the image of the non-image-printed area so as to surround the reference image on the periphery of the reference image with the non-image-printed area;
compare respective pixel values of the read image and the reference image;
determine whether each of the respective pixel values are associated with the image-printed area or the non-image-printed area;
detect an error in the printed target image associated with the image-printed area in response to a difference between the first pixel value and the second pixel value being higher than a threshold value; and
ignore an error in the printed target image associated with the non-image-printed area based on the third pixel value.

9. An image inspection method for checking a target image printed on a recording medium, the method comprising:
generating a reference image from image data of the target image;
obtaining a first pixel value from the reference image;
extracting an image-printed area from a read image of the target image containing the recording medium on which the target image to be checked is printed and a conveying body conveying the recording medium;
obtaining a second pixel value from the image-printed area of the read image to be checked;
generating an image of a non-image-printed area containing a third pixel value with which it can be determined that the third pixel value is associated with the non-image-printed area, the third pixel value being different from the first pixel value and the second pixel value;
adding the image of the non-image-printed area so as to surround the reference image on the periphery of the reference image with the non-image-printed area;
comparing respective pixel values of the read image and the reference image;
determining whether each of the respective pixel values are associated with the image-printed area or the non-image-printed area;
detecting an error in the printed target image associated with the image-printed area in response to a difference between the first pixel value and the second pixel value being higher than a threshold value; and
ignoring an error in the printed target image associated with the non-image-printed area based on the third pixel value.

10. The image inspection apparatus set forth in claim 2, wherein upon detecting an error in a hold detection area defined on at least one corner of the reference image and the read image to be checked, the processor is configured to determine that the recording medium is folded.

11. The image inspection apparatus set forth in claim 3, wherein upon detecting an error in a hold detection area defined on at least one corner of the reference image and the read image to be checked, the processor is configured to determine that the recording medium is folded.

12. The image inspection apparatus set forth in claim 4, wherein upon detecting an error in a hold detection area defined on at least one corner of the reference image and the read image to be checked, the processor is configured to determine that the recording medium is folded.

13. The image inspection apparatus set forth in claim 5, wherein upon detecting an error in a hold detection area defined on at least one corner of the reference image and the read image to be checked, the processor is configured to determine that the recording medium is folded.

14. The image inspection apparatus set forth in claim 6, wherein upon detecting an error in a hold detection area defined on at least one corner of the reference image and the read image to be checked, the processor is configured to determine that the recording medium is folded.

15. The image inspection apparatus set forth in claim 1, wherein adding the image of the non-image-printed area so as to surround the reference image includes matching a size of the read image and a size of the reference image.

* * * * *